(12) United States Patent
Tuthill et al.

(10) Patent No.: US 11,419,313 B2
(45) Date of Patent: Aug. 23, 2022

(54) BIRD FEEDER

(71) Applicant: Hebe Studio Limited, Oxfordshire (GB)

(72) Inventors: James Tuthill, Oxfordshire (GB); Johannes Paul, London (GB); Simon Nicholls, Northamptonshire (GB); William Windham, Oxfordshire (GB)

(73) Assignee: HEBE STUDIO LIMITED, Oxfordshire (GB)

( * ) Notice: Subject to any disclaimer, the term of this patent is extended or adjusted under 35 U.S.C. 154(b) by 12 days.

(21) Appl. No.: 16/500,225

(22) PCT Filed: Apr. 3, 2018

(86) PCT No.: PCT/EP2018/058404
§ 371 (c)(1),
(2) Date: Oct. 2, 2019

(87) PCT Pub. No.: WO2018/188983
PCT Pub. Date: Oct. 18, 2018

(65) Prior Publication Data
US 2021/0127642 A1 May 6, 2021

(30) Foreign Application Priority Data
Apr. 3, 2017 (GB) ...................................... 1705363

(51) Int. Cl.
*A01K 39/012* (2006.01)
*A01K 39/04* (2006.01)
*A01K 31/12* (2006.01)

(52) U.S. Cl.
CPC ............ *A01K 39/012* (2013.01); *A01K 31/12* (2013.01); *A01K 39/04* (2013.01)

(58) Field of Classification Search
CPC ...... A01K 39/012; A01K 39/04; A01K 39/00; A01K 31/12
See application file for complete search history.

(56) References Cited

U.S. PATENT DOCUMENTS

| 364,557 A | 6/1887 | Walin |
|---|---|---|
| 1,666,322 A | 4/1928 | West |

(Continued)

FOREIGN PATENT DOCUMENTS

| GB | 373306 A | 5/1932 |
|---|---|---|
| KR | 1020140136550 A | 12/2014 |
| WO | 8402056 A1 | 6/1984 |

OTHER PUBLICATIONS

Translation of Lussi, WO-8402056-A1 (Year: 2021).*
(Continued)

*Primary Examiner* — Timothy D Collins
*Assistant Examiner* — Madeline L Douglas
(74) *Attorney, Agent, or Firm* — Taft Stettinius & Hollister LLP; Stephen F. Rost

(57) ABSTRACT

A bird feeder 13 that includes a hopper 23, 25 for providing a supply of food or fluid for a bird, a receptacle 15 for waste food or fluid, and a hopper support 35. The hopper includes a storage compartment 27, 29 for a supply of food or fluid for a bird, and a tray 31, 33 into which food or fluid from the storage compartment can flow. The hopper support 35 is configured to support the hopper 23, 25 in such a position that food or fluid can flow from the storage compartment 27, 29 to the tray 31, 33, and so that waste food or fluid can pass into the receptacle 15. The hopper 23, 25 is removable from the feeder 13 for cleaning or for replenishing the supply of fluid or food in the storage compartment 27, 29.

18 Claims, 9 Drawing Sheets

(56) References Cited

U.S. PATENT DOCUMENTS

| | | | |
|---|---|---|---|
| 2,878,729 A | | 3/1959 | Gibson |
| 3,675,627 A | * | 7/1972 | Myers .................. A01K 39/022 |
| | | | 119/72 |
| 4,327,669 A | | 5/1982 | Blasbalg |
| 4,632,061 A | | 12/1986 | Tucker et al. |
| 5,829,382 A | | 11/1998 | Garrison |
| 2002/0157615 A1 | * | 10/2002 | Laske, Jr. ............ A01K 39/012 |
| | | | 119/57.8 |
| 2010/0031890 A1 | | 2/2010 | Vosbikian |
| 2010/0258054 A1 | | 10/2010 | Frazier |
| 2015/0122157 A1 | * | 5/2015 | Cote ...................... F16B 9/058 |
| | | | 108/24 |

OTHER PUBLICATIONS

GB Intelleclual Property Office Search Report, dated Oct. 3, 2017; pp. 1-5.
European Patent Office International Search Report and Written Opinion of the ISA, dated Nov. 15, 2018; pp. 1-15.

\* cited by examiner

BIRD FEEDER

This application is national stage application under 35 U.S.C. § 371 of PCT International Application Serial No. PCT/EP2018/058404, which has an international filing date of Apr. 3, 2018, designates the United States of America, and claims the benefit of GB Application No. 1705363.8, which was filed on Apr. 3, 2017, the disclosures of which are hereby expressly incorporated by reference in their entirety.

FIELD

This invention relates to bird feeders, particularly but not exclusively to a bird feeder for installation inside a bird cage.

BACKGROUND

A previously proposed bird feeder comprises a trough that can be attached to the inside of a mesh wall of a cage. Birds within the cage can perch on the edge of the trough to retrieve seeds and other types of bird food from within the trough.

A problem with this arrangement is that as birds tend to look around whilst eating, the husks of the seeds often fall outside of the trough onto the floor of the cage. When the bird flies around inside the cage or flaps its' wings, husks lying on the floor of the cage can be blown through the mesh walls of the cage, dirtying the room in which the cage is installed.

An associated drawback with such a feeder is that the birds tend to forage in amongst the husks and other waste (for example, faeces) on the floor of the cage for any seeds that might have dropped from the feeder, thereby raising the potential for the birds to ingest that waste.

Another previously proposed feeder that attempted to address some of these problems had a hood that covered the trough, so that the bird had to lean into the trough to reach the food. Whilst this arrangement did reduce the amount of debris that tends to fall from the trough onto the floor of the cage, a problem is that the husks and other food debris tends to fall back into the trough where they mix with the uneaten seeds. A consequence of this is that over time the percentage of food to husk reduces, thereby making it harder for a bird to find food and for the owner to gauge how much food is left in the feeder.

A side elevation of another previously proposed feeder is shown in FIG. 1. This feeder 1 is designed to be fixed onto the outside of a cage and includes a hopper 3 for bird seed. The hopper opens to a tray 5 from which a bird sat on a perch 7 mounted towards the front edge of the feeder can retrieve seed. A grill 9 is provided between the perch 7 and the tray 5 so that husks and other food waste can fall into a removable drawer 11 (removable by pulling it in a direction away from the perch 7), assuming of course that the bird eats the seed whilst it is above the grill.

Whilst this previously proposed arrangement improves upon the other previously proposed arrangements described above, it has its' own set of drawbacks and disadvantages. Firstly, as the feeder is designed to be mounted on the outside of a cage, it is the case that a user must cut a hole into the side of their cage in order to mount the feeder to the wall of the cage and provide access to the tray. Another issue with this feeder is that whilst the drawer can be removed for cleaning, it is difficult—if not impossible—to clean the hopper or the tray without first decoupling the entire feeder from the cage. This is inconvenient for the user and risks allowing the birds within the cage to escape through the hole cut in the cage that accommodates the feeder. Another related issue is that whilst it is conceivable for the feeder to be mounted inside a cage, in such an arrangement a user would have to decouple the entire feeder from the cage wall in order to remove and empty the drawer.

Furthermore, as the feeder is only capable of dispensing bird seed, a second feeder will be required for water, and two feeders mounted on the cage wall will tend to obscure an owners view of the birds within the cage—especially if the cage is located in the corner of a room. It will also likely be difficult for a user to use such a feeder with a cage that is not square or rectangular in cross section.

Another issue is that in circumstances where multiple birds are sharing a cage, it is possible for one bird to bully another and deny it access to the tray containing the bird seed. Yet another drawback is that the apertures in the grill set between the tray and the perch are of such a size that a bird sat on the perch may well still be able to access the waste in the drawer—especially in circumstances where the amount of waste in the drawer has been allowed to build up. Lastly, it is also the case that food waste will only be captured if the bird eats the seed whilst it is facing towards the tray and its' head is above the grill. If the bird were to turn around and then eat the seed, it is likely that husks will still fall onto the floor of the cage.

The present invention has been devised with the foregoing problems in mind.

SUMMARY

In accordance with a presently preferred embodiment of the present invention, there is provided a bird feeder comprising: a hopper for providing a supply of food or fluid for a bird, said hopper comprising a storage compartment for a supply of food or fluid for a bird, and a tray into which food or fluid from said storage compartment can flow; a receptacle for waste food or fluid, and a hopper support configured to support the hopper in such a position that food or fluid can flow from said storage compartment to the tray, and so that waste food or fluid can pass into said receptacle; wherein the hopper is removable from the feeder for cleaning or for replenishing the supply of fluid or food in said storage compartment.

By providing a removable hopper, the user need no longer remove the entire feeder from the cage to replenish the hopper or clean it.

Preferably the tray defines a plurality of spaced dispensing regions into which food or fluid from said storage compartment can flow. An advantage of this arrangement is that when one dispensing region is occupied by a bird, a second bird can use the second dispensing region.

Preferably said tray comprises a floor which is inclined towards each of said dispensing regions. The tray may include a plurality of peripheral walls that co-operate to define an internal void that opens to said dispensing regions.

The storage compartment may include a plurality of peripheral walls that co-operate to define a dispensing aperture. The peripheral walls of the tray that define the internal void and the peripheral walls of the storage compartment that define the dispensing aperture may respectively define an internal void and a dispensing aperture that have complementary shapes. The internal void and said dispensing aperture may be substantially D-shaped.

A tray for a hopper configured for fluid supply preferably includes an internal wall that subdivides said internal void. The internal wall may include a notch through which fluid can flow.

The internal wall may comprise first and second taller regions, and a third shorter region located between said first and second taller regions, said notch being provided within said shorter region.

When said storage compartment is fitted to said tray, a portion of the peripheral walls of the storage compartment that co-operate to define said dispensing aperture may overlap said shorter region of said internal wall so that fluid from said storage compartment can flow over said internal wall and into said dispensing regions.

In a preferred embodiment, the receptacle defines a void for the receipt of waste food or fluid. The void defined by said receptacle may be subdivided into a plurality of smaller voids by a plurality of baffles. Each said baffle may comprise a radial wall. Preferably, the baffles are configured to disrupt air flow through said receptacle.

In one envisaged implementation, said receptacle may co-operate with said hopper support so that each dispensing region is associated with a different one of the smaller voids, the arrangement being such that waste from one said dispensing region tends to pass only into the smaller void associated with that dispensing region and not into neighbouring smaller voids.

Preferably the hopper support includes a peripheral skirt for obstructing bird access to waste within said receptacle. Preferably, the skirt covers a major portion of the receptacle, a gap through which waste can pass being provided between said skirt and a wall of said receptacle. Preferably the skirt is domed so as to deter birds from roosting on the skirt.

In one implementation, the hopper support may be configured to support two hoppers. The hoppers may each include a flat rear wall, and said hopper support may be configured to support said hoppers in a back-to-back arrangement.

Preferably said hopper includes a curved surface that is uppermost in use, said curved surface acting to deter birds from roosting on top of the hopper.

Preferably said back-to-back hoppers cooperate to provide a domed surface that is uppermost in use, said domed surface acting to deter birds from roosting on the back-to-back hoppers.

The feeder may further comprise a perch. Preferably the perch is located above said receptacle so that waste food or fluid will tend to pass into the receptacle. The perch may be configured to couple to said hopper support.

Preferably the storage compartment and tray are separably push fitted to one another. The receptacle may be configured to define a void into which a bird feeder mounting pole can be inserted.

Another embodiment of the present invention relates to a hopper for the bird feeder described herein, said hopper comprising a storage compartment for a supply of food or fluid for a bird, and a tray into which food or fluid from said storage compartment can flow.

A further embodiment of the invention provides a bird feeder comprising: a domed receptacle for waste food or fluid, said receptacle defining an internal void that is subdivided into four smaller voids by a plurality of radial walls; a first hopper for the supply of fluid, said first hopper including a storage compartment for a supply of fluid for a bird, and a tray into which fluid from said storage compartment can flow, said tray including two spaced dispensing regions; a second hopper for the supply of food; said second hopper including a storage compartment for a supply of food for a bird, and a tray into which food from said storage compartment can flow, said tray including two spaced dispensing regions; a hopper support having a skirt that is configured to be supported on the radial walls that subdivide the internal void within the receptacle, the hopper support being inversely domed to the receptacle, said support including four upstanding spaced columns; and a circular perch connectable to said columns so that said perch lies above said skirt and the receptacle below the skirt; wherein said first and second hoppers can be supported on said hopper support in abutment with said columns in a back-to-back configuration so that each dispensing region lies between two of said four columns, said four dispensing regions being spaced from one another by approximately 90 degrees.

BRIEF DESCRIPTION OF THE DRAWINGS

Various aspects of the teachings of the present invention, and arrangements embodying those teachings, will hereafter be described by way of illustrative example with reference to the accompanying drawings, in which.

DETAILED DESCRIPTION

Figure 1:
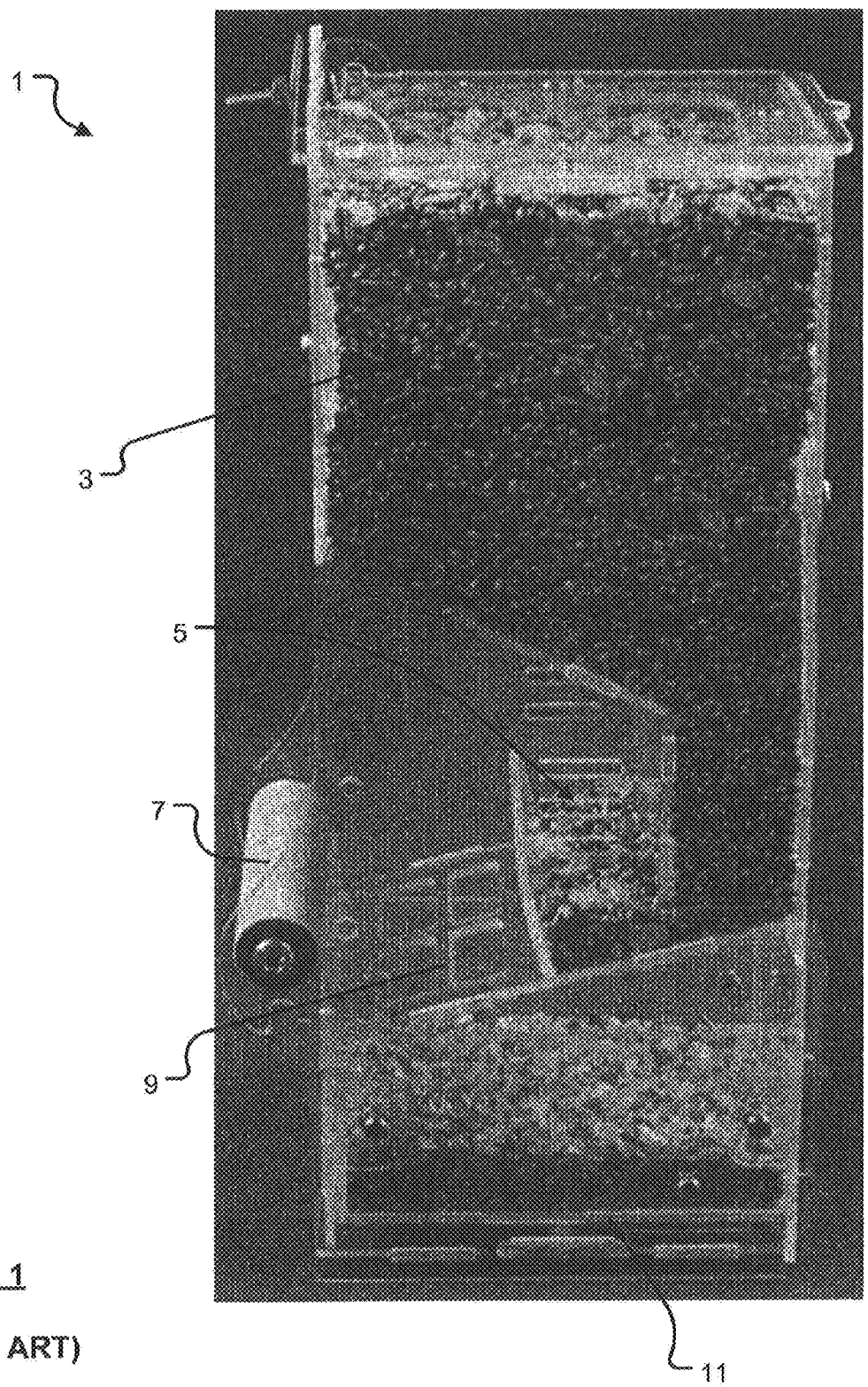
FIG. 1 is a side elevation of a previously proposed bird feeder.

Referring now to FIGS. 2 to 6 of the accompanying drawings, there are shown various views of a bird feeder 13 that embodies the teachings of the present invention. The feeder 13 is primarily intended for installation within a cage that is kept indoors, and embodiments of the invention are operable to supply a bird with bird food (e.g. bird seed) and drinking materials (e.g. water); bird food only or drinking materials only. As such, references below to "food" or indeed to a "feeder" are intended to be interpreted in the broadest sense of, respectively, anything that can be eaten or drunk by a bird, and apparatus for supplying eatable or drinkable matter to birds. The reader is explicitly requested to note that references to "food" or to a "feeder" should not be interpreted to exclude anything that could be drunk by a bird.

The feeder 13 comprises a waste receptacle 15 that defines an internal void 16 into which waste can fall. The internal void 16 is subdivided by a plurality of internal baffles 17 (FIG. 6) that function as a support for the remaining components of the feeder 13. The baffles 17 also function as a means for disrupting airflow through the void 16 of the waste receptacle 15 (thereby reducing the extent to which waste, such as bird seed husks, can be blown from the receptacle), and—in a particularly preferred arrangement—as a means for separating different types of waste.

In the preferred arrangement, the receptacle 15 is generally dish-shaped, and the aforementioned baffles meet at a hollow post 19 that opens to the underneath of the receptacle to define a void 21 inside the post 19 into which a feeder mounting pole (not shown) can be inserted. Conveniently the receptacle can be injection moulded from a plastics material.

The feeder 13 includes two hoppers—in a preferred arrangement, one hopper 23 for food (for example, bird seed) and a second hopper 25 for water. In other arrangements, the feeder could include two food hoppers or two water hoppers. Each hopper 23, 25 comprises a storage compartment 27, 29 that is fitted to a tray 31, 33 in such a manner that the compartment and tray can be separated from one another, for example for cleaning of the tray and/or compartment or for refilling of the compartment. Other features of the hoppers are described below in relation to FIGS. 8 to 14 of the drawings.

Figure 3:
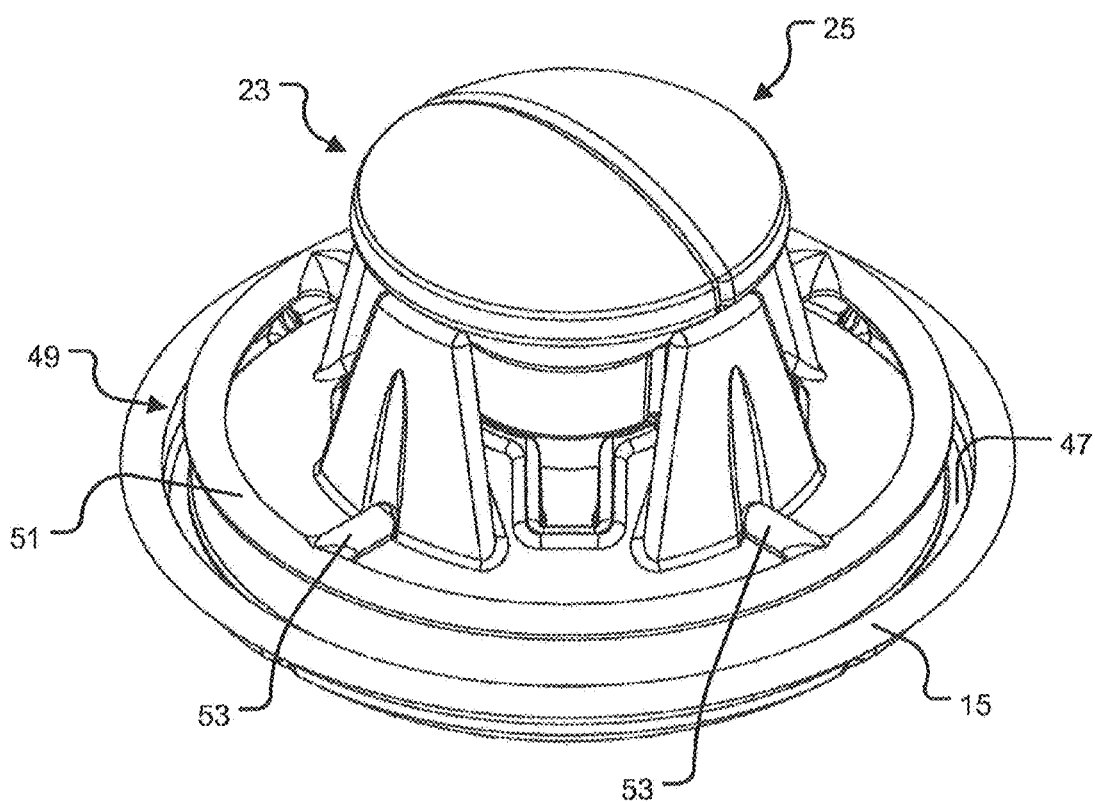
FIG. 3 is a schematic isometric view of the bird feeder shown in FIG. 2.
Figure 4:
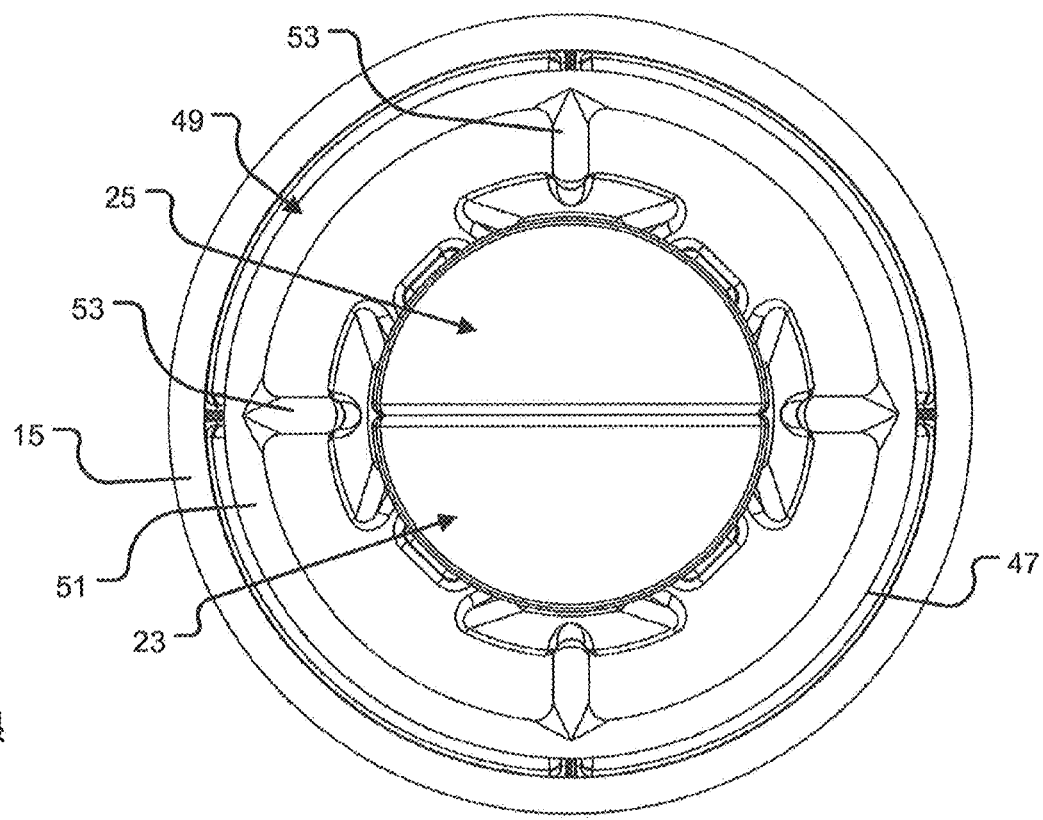
FIG. 4 is a top plan view of the feeder shown in FIGS. 2 and 3.
Figure 5:
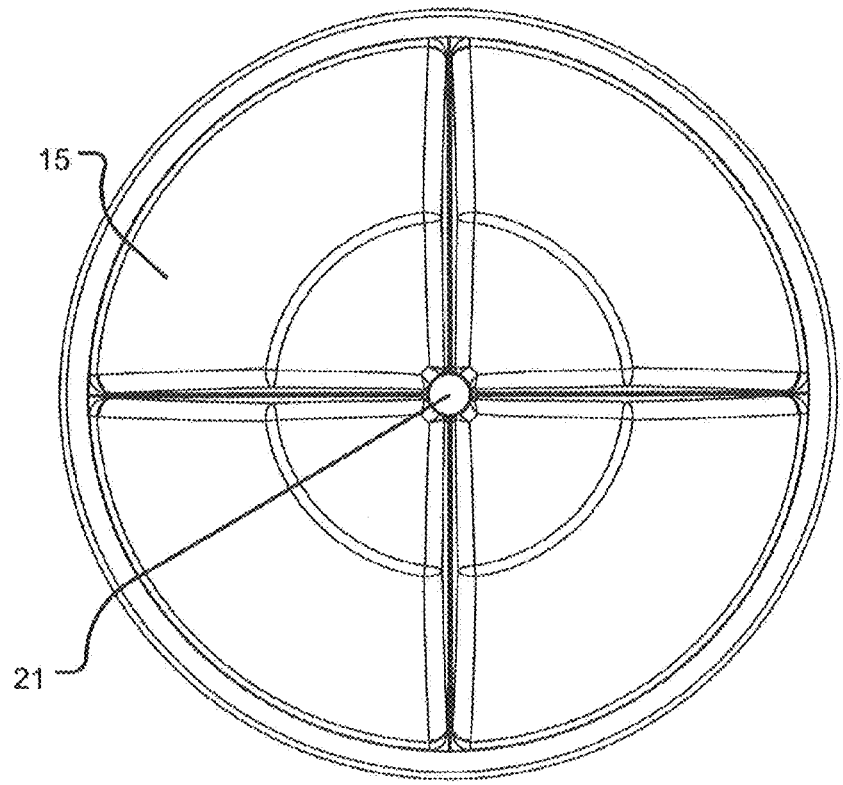
FIG. 5 is an underneath plan view of the feeder shown in FIGS. 2 to 4.
Figure 6:
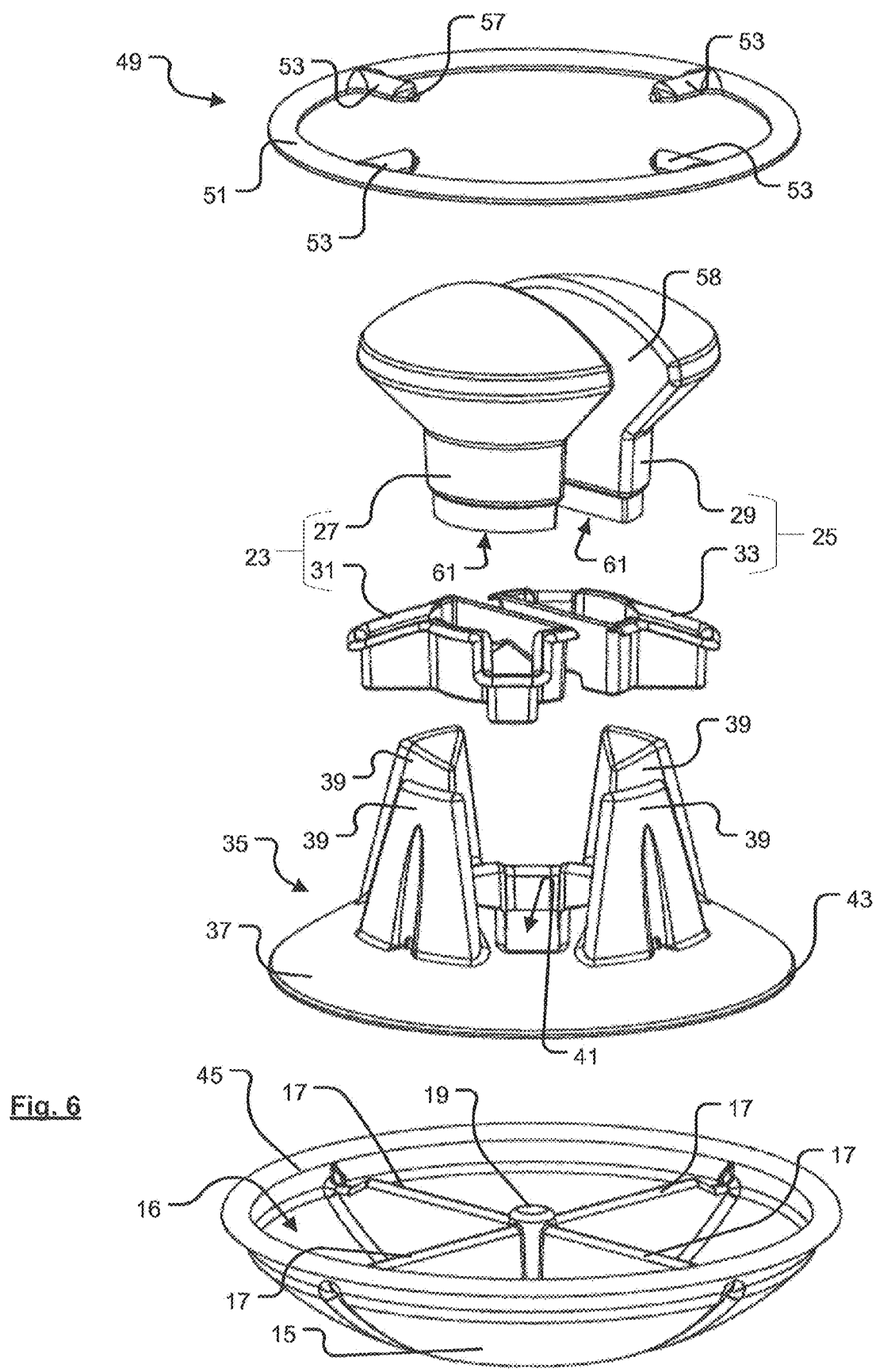
FIG. 6 is an exploded isometric view of the feeder shown in FIGS. 2 to 5.

The hoppers 23, 25 abut back-to-back in use (as shown in FIGS. 3 and 4, for example) and are supported in a generally upright position above the receptacle by a hopper support 35 that comprises a skirt 37 and a plurality of columns 39 that project from the skirt. The skirt includes an aperture 41 for receiving the trays 31, 33 of the hoppers 23, 25 and the columns are spaced about the periphery of the aperture 41 so that the trays 31, 33 of the hoppers 23, 25 can be accessed by feeding birds.

The skirt 37 is configured to cover most of the void 16 within the receptacle 15 when the hopper support 35 is supported on the internal baffles 17 of the receptacle 15. The skirt is also configured so that a small annular gap 47 is provided between an outer circumferential edge 43 of the hopper support and an inner circumferential edge 45 of the receptacle—the gap 47 being (in a preferred arrangement) sufficiently large to enable food waste to fall into the receptacle below the skirt but not so large that a bird can easily access waste in the receptacle through the gap. In one implementation the gap may be up to 1 cm wide. It is preferred for the skirt 37 to be inclined from the aperture 41 in which the trays sit so that waste dropped by birds feeding at the feeder automatically tends to fall towards the gap and into the void within the receptacle. In one implementation the skirt 37 is dish-shaped, preferably the skirt has a shape that is substantially the inverse of that of the receptacle. An advantage of having a dished skirt is that such a shape tends to deter birds from standing on the skirt when the feeder has been assembled.

Figure 7:
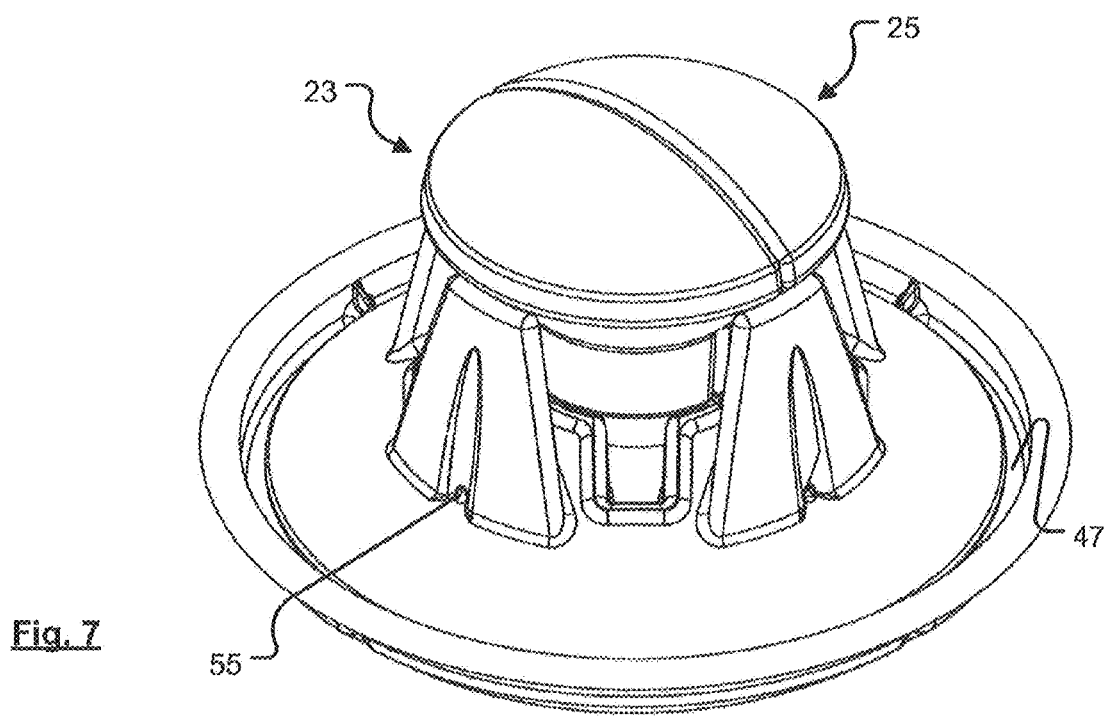
FIG. 7 is an isometric view of the feeder shown in FIGS. 2 to 5 with a perch removed.

The feeder 13 includes a perch 49 that comprises a ring 51 and a plurality of radially inwardly extending support arms 53. A radially outward surface of each column 39 is provided with a groove that leads to a socket 55 (FIG. 7) for receiving a peg 57 on a respective radially innermost end of each of the support arms 53. Advantageously, the perch 49 is configured so that birds sat thereupon are located generally above the void 16 defined by the receptacle 15 irrespective of whether they are facing towards or away from the hoppers 23, 25 (meaning, of course, that waste is more likely to fall into the receptacle regardless of the orientation of the birds relative to the hoppers).

Figures 8, 9:
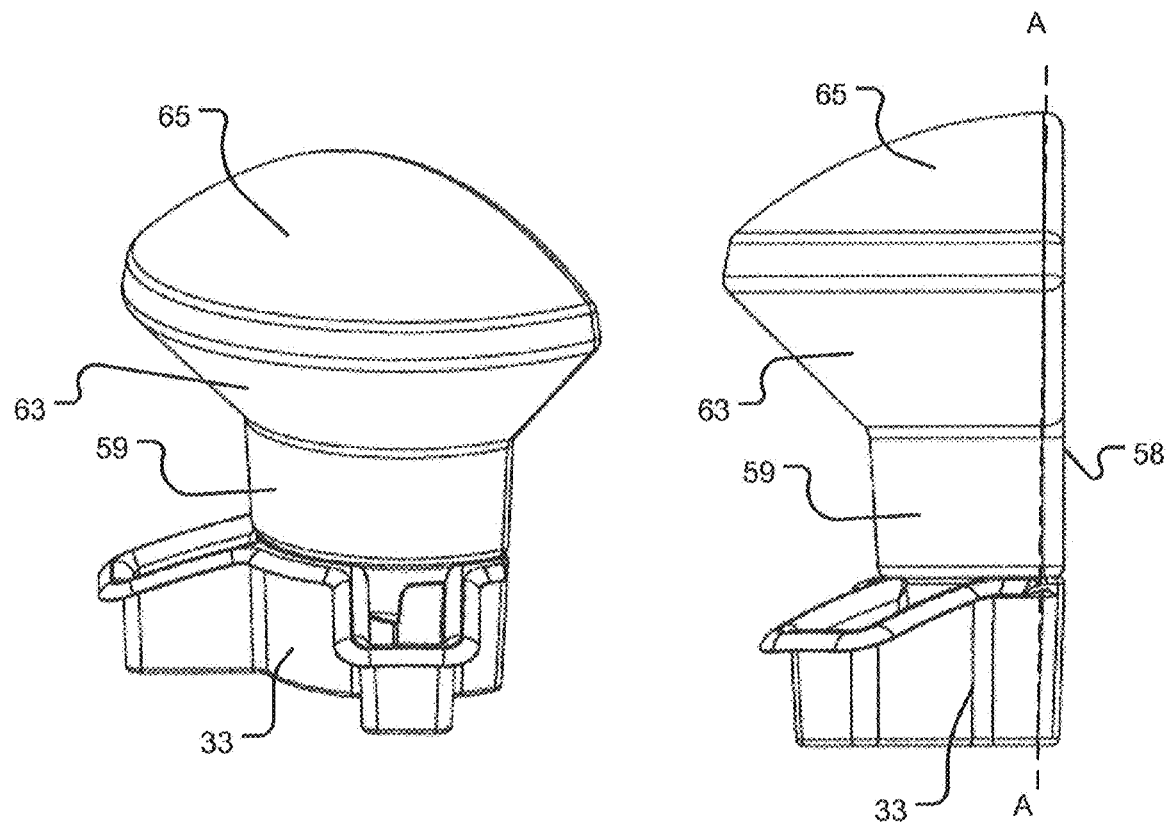
FIGS. 8 and 9 are, respectively, an isometric view and a side elevation of a water hopper of the feeder depicted in FIGS. 2 to 7.
Figure 10:
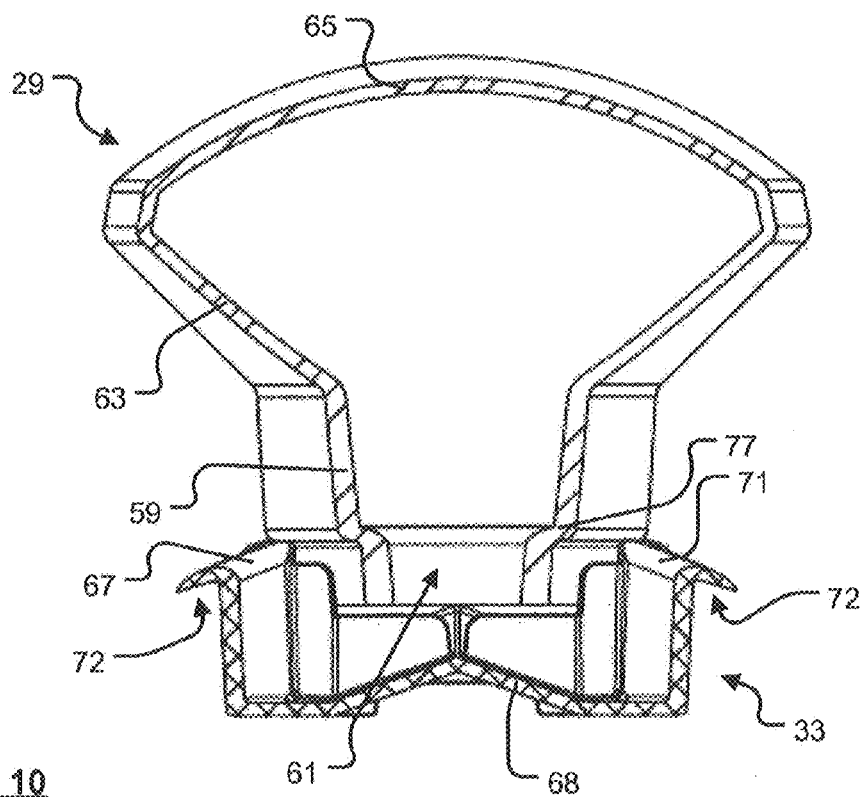
FIG. 10 is an enlarged cross-sectional view of the hopper shown in FIG. 9 along the line A-A of FIG. 9.
Figure 11:
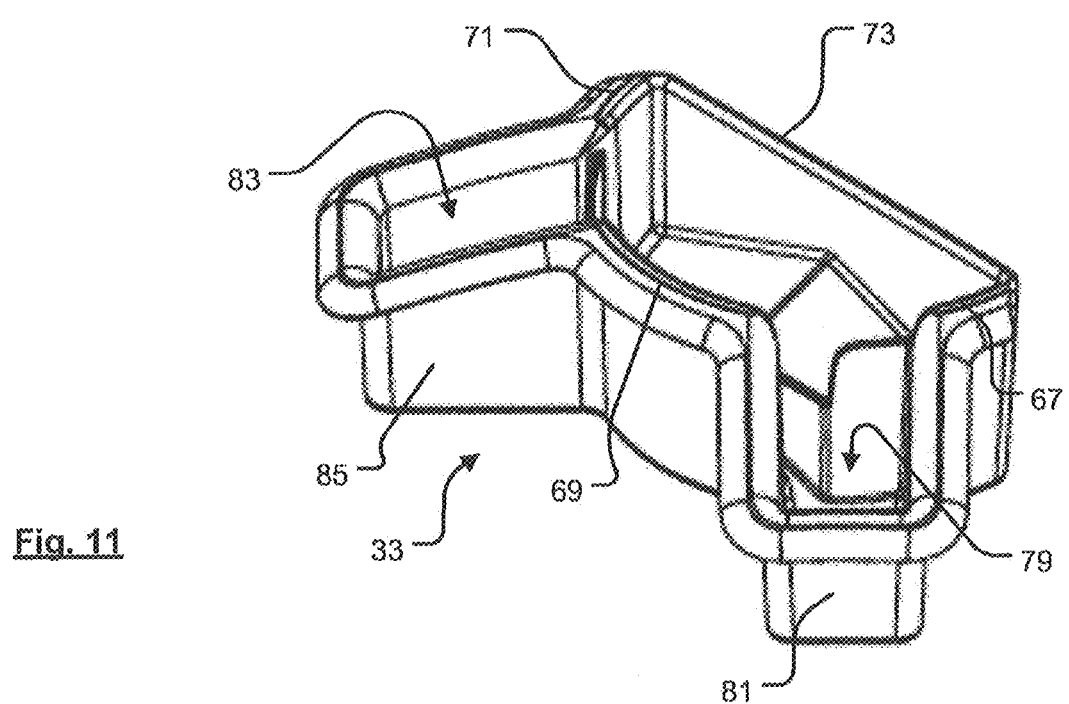
FIGS. 11 to 13 are, respectively a front right isometric view, a rear isometric view and a top plan view of a tray part of the hopper depicted in FIGS. 8 to 10.
Figure 12:
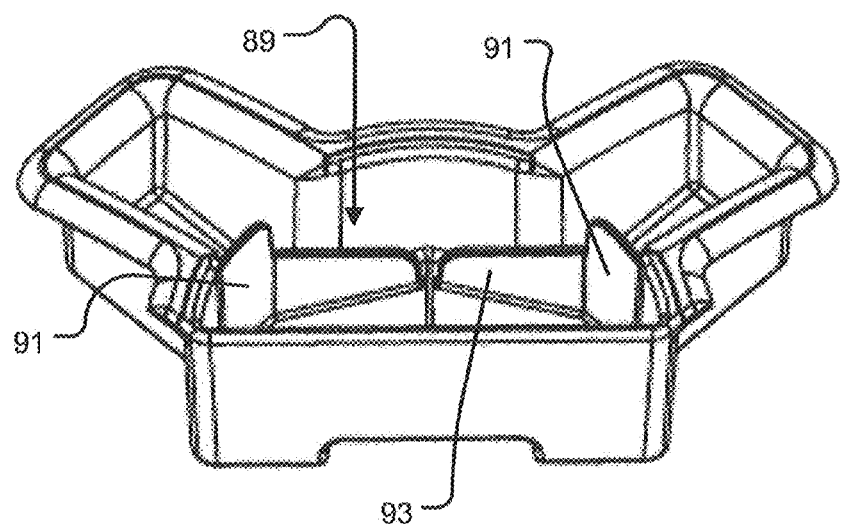
Figure 13:
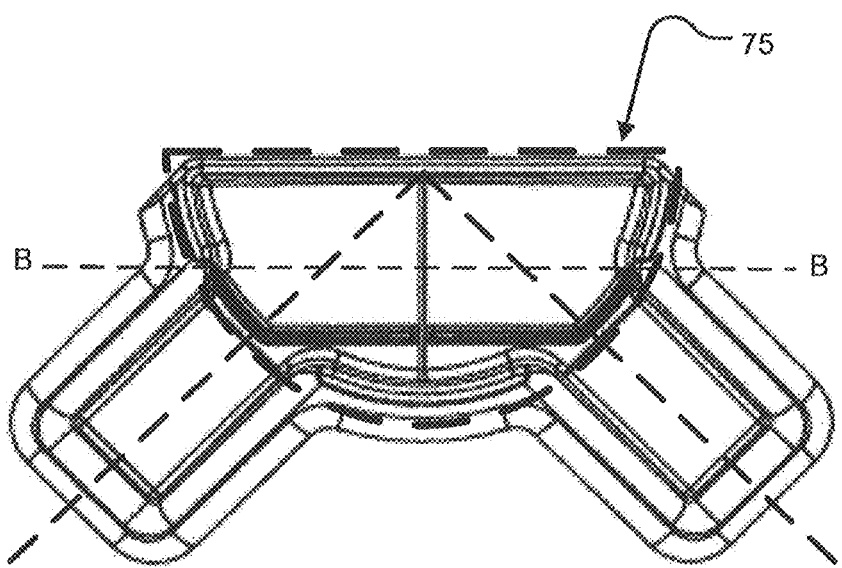
Figure 14:
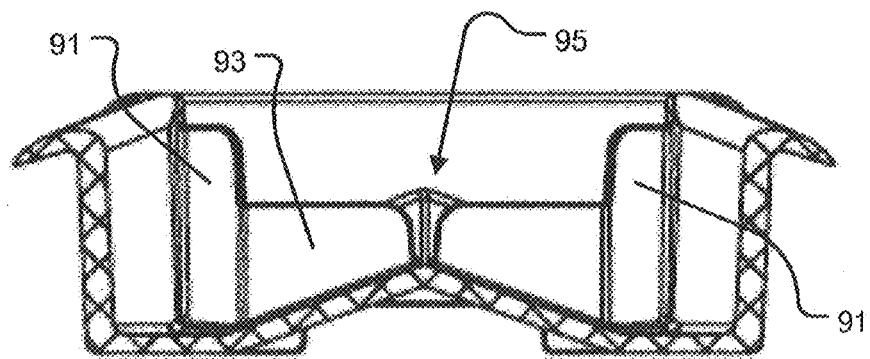
FIG. 14 is a cross-sectional view of the tray part depicted in FIGS. 11 to 13 along the line B-B of FIG. 13.

Referring now to FIGS. 8 to 14 of the drawings, there is depicted a hopper 25 that is configured, in this particular example, for water storage. As described above, the hopper 25 includes a storage compartment 29 and a tray 33, and is depicted in FIGS. 8 to 10 with the storage compartment 29 fitted (preferably releasably push fitted, so that the storage compartment and tray can be separated from one another) to the tray 33.

Figure 2:
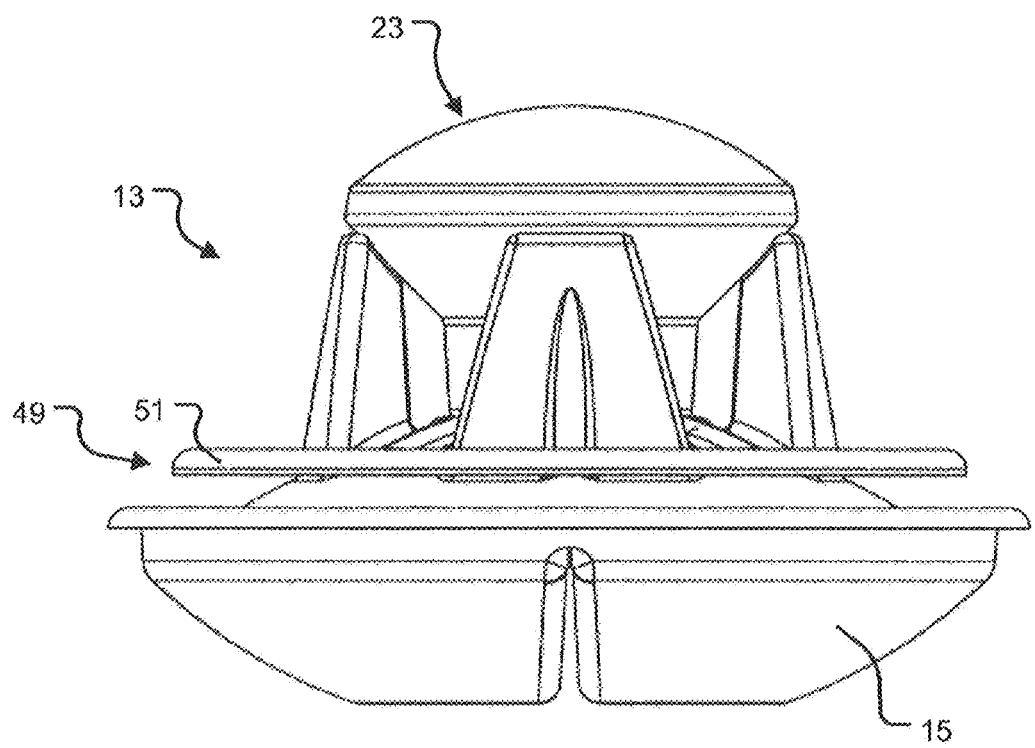
FIG. 2 is a side elevation of a bird feeder embodying the teachings of the present invention.

The storage compartment comprises a curved wall 59 (preferably at least substantially semi-circular) that co-operates with a substantially flat rear wall 58 (FIG. 6) to define a generally D-shaped outlet 61 (FIG. 6) for the storage compartment. The curved wall 58 extends outwardly to an expanded storage portion 63 that is closed by an upper wall 65 that is generally semi-domed in shape so as to deter birds from standing on top of the feeder when the feeder has been assembled. As is best shown in FIGS. 2 and 4, when two hoppers are arranged back to back (i.e. with flat rear walls abutting) the expanded storage portion of one said hopper co-operates with the expanded storage portion of the other hopper to form a feed and/or water store whose upper part is generally circular in plan view (FIG. 4) and domed in elevation (FIG. 2).

The tray 33 (FIG. 11) includes first, second and third curved peripheral walls 67, 69, 71 that cooperate with a straight rear wall 73 to define a generally D-shaped (in plan view) region 75 (shown in dashed lines in FIG. 13) that is sized to co-operate with the D-shaped outlet 61 of the storage compartment 29. As shown in FIG. 10 a portion of the curved wall 59 includes an inward step 77 that abuts against the first, second, third and rear walls of the tray 33 to limit the extent to which the curved wall 59 can be fitted into the D-shaped region 75 of the tray 33.

The D-shaped region defines a void that opens to a first dispensing void 79 of a first dispensing region 81 located between the first and second part-circular peripheral walls 67, 69, and to a second dispensing void 83 of a second dispensing region 85 located between the second and third part-circular peripheral walls. As can best be seen in FIG. 13, the first and second dispensing regions 79, 83 each extend outwardly beyond the D-shaped region at an angle of about 45 degrees from the rear wall 73. As shown in FIG. 10, the D shaped region includes a floor 68 that is inclined towards both of the dispensing portions so that material within the storage compartment naturally tends to flow towards the dispensing regions.

Figure 15:
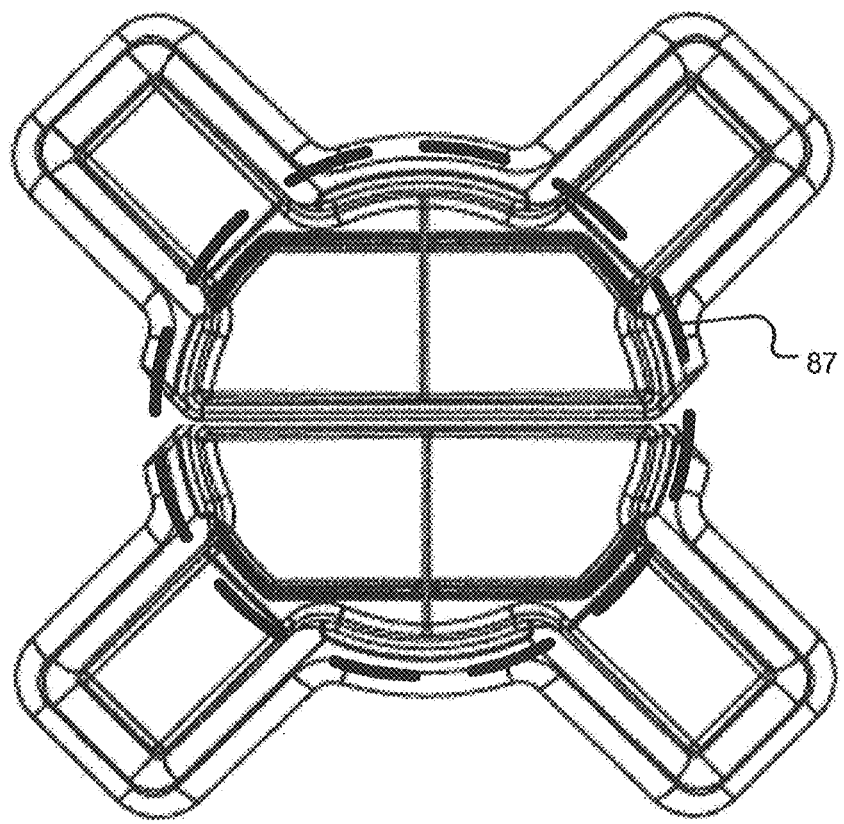
FIG. 15 is a schematic plan view of two like tray parts of the type depicted in FIGS. 11 to 14 placed back to back.

As will be appreciated by persons skilled in the art, when two trays are placed together so that the straight rear wall of one tray abuts against the straight rear wall of the other tray, the two D-shaped regions of the abutted trays will form a generally circular portion 87 (FIG. 15) from which the four dispensing regions extend, with the four dispensing regions set at roughly 90 degrees to one another. The aperture 41 in the skirt 37 is shaped to cooperate with two trays, and at least the first, second and third curved walls of each tray include an outwardly extending lip 72 (FIG. 10) that prevents the trays from passing through the aperture 41 in the skirt 37.

As mentioned above, the hopper depicted in FIGS. 8 to 10 is configured for the dispense of water or other drinking material, and to that end the tray part 33 of the hopper includes an internal wall 89 (FIGS. 11 to 14) that sub-divides the internal void of the D-shaped region. The internal wall includes two taller portions 91 that seal against the inwardly stepped portion 77 of the storage compartment when the tray and storage compartment are fitted together, and a smaller lateral wall 93 against which the wall of the storage compartment that defines the D-shaped open end 61 abuts when the storage compartment is push-fitted to the tray. When the storage compartment and tray are push fitted together, that portion of the wall of the storage compartment that extends between the taller portions 91 of the internal wall 89 overhangs the smaller lateral wall 93 so that water (or other drinkable fluid) can flow out of the storage compartment and into the aforementioned dispensing regions. The smaller lateral wall 93 also includes a notch 95 that extends to the base of the D-shaped region so that substantially all of the water in the storage compartment can flow out into the dispensing regions.

Advantageously, the storage compartment and tray for fluid dispense are configured (in particular as regards the way that the storage compartment and internal wall interact) so that fluid does not overflow the walls that define the dispensing regions, and dispense of fluid is not obstructed by airlocks. In a particularly preferred arrangement, the smaller lateral wall is the same height or smaller than the smallest wall of the aforementioned dispensing regions. By virtue of this arrangement, when the compartment has been filled with water, engaged with the tray, and then inverted, water will flow into the dispensing regions until they are full. At this point, no air can get into the storage compartment until the level of water in at least one of the dispensing regions reduces and thus the flow of water ceases. Once the level of water reduces, air can flow through the overlap between the smaller lateral wall 93 and the wall defining the D-shaped region, and water can once more flow into the dispensing region(s) until they are full.

Figure 16:
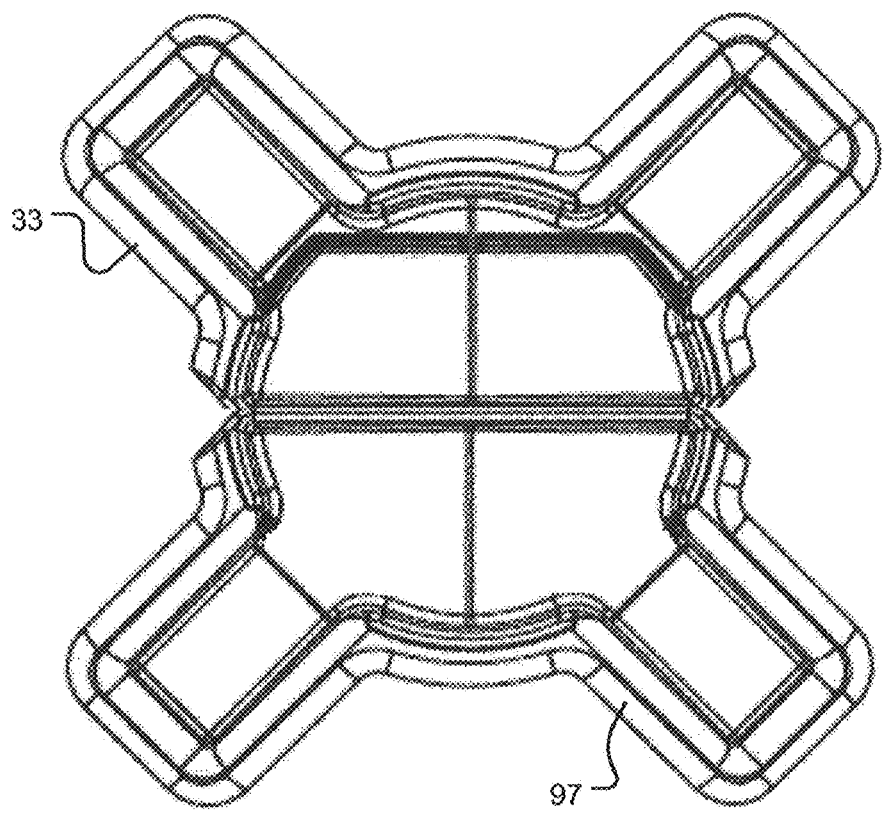
FIG. 16 is a schematic plan view of one tray part of the type depicted in FIGS. 11 to 15 placed back to back with a second different type of tray part.
Figure 17:
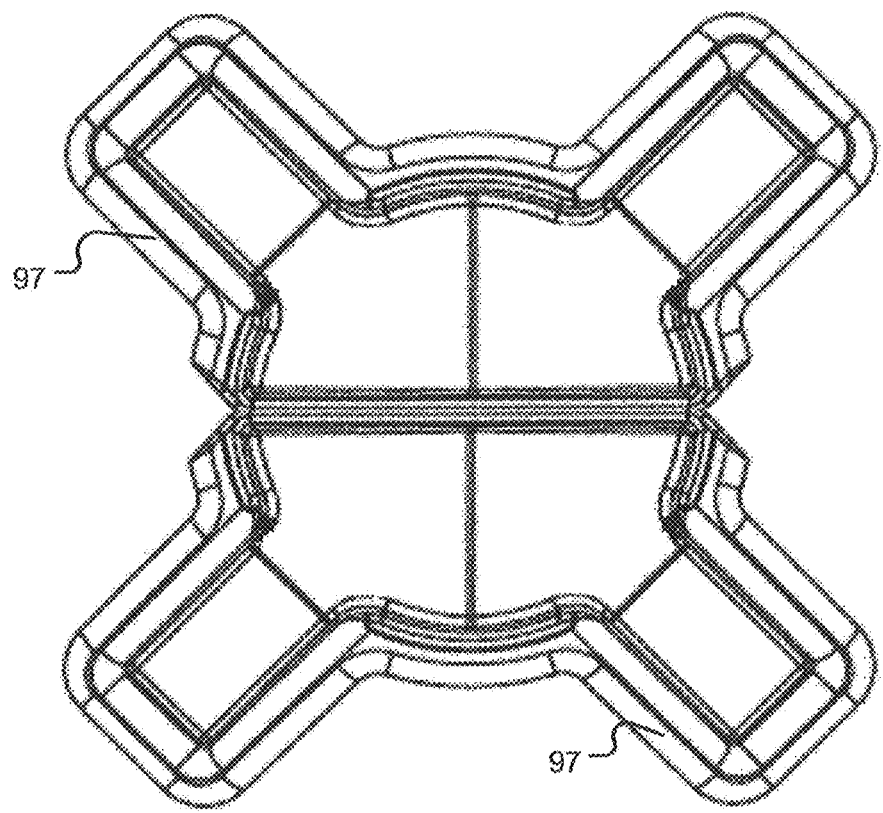
FIG. 17 is a schematic plan view of two of the second type of tray parts depicted in FIG. 16 placed back to back.

Referring now to FIG. 16, there is depicted a tray 97 for the food hopper 23 arranged back to back with the tray 33 of the fluid hopper 25, and FIG. 17 depicts two food hopper trays 97 arranged back to back. The food hopper 23 comprises a storage compartment that is identical in all respects to the storage compartment for the water hopper, and is consequently not further described herein. The tray 97 for the food hopper 23 is identical to the tray 33 of the fluid hopper except for the fact that the food hopper tray 23 does not include an internal wall 89 and thus the internal void defined by the D-shaped region is not subdivided. As will be appreciated by persons of ordinary skill in the art, when the food hopper is installed on top of the skirt, food will fall from the storage compartment under gravity and will be directed towards the two dispensing regions by the inclined floor of the D-shaped region.

In the preferred implementation of the teachings of the invention, the hoppers co-operate to provide four distinct dispensing zones, and an advantage of this arrangement is that if a bird is prevented from feeding or drinking at one dispensing region (for example, by another bird) then it can simply go to another dispensing region.

It is also preferred that the skirt 37 is configured to locate on the baffles 17 within the void 16. For example, the skirt may include a plurality of notches in its outer circumferential edge, at least one or more of which can be located on cooperating tabs upstanding from the baffles so that the relative orientation of the hopper support and receptacle is maintained and the hopper support cannot rotate relative to the receptacle. In a preferred implementation at least two baffles include a said tab, and the skirt includes two appropriately positioned notches.

In a particularly preferred implementation of the invention, the receptacle includes four baffles that subdivide the internal void into four compartments (preferably four compartments of substantially equal volumes). In this implementation it is also preferred for the hopper support to include four columns, and for the notches in the outer peripheral wall of the skirt to be located adjacent a respective column. In this way, when one or more (preferably, two) of the notches engage with cooperating tabs, each dispensing region will lie above one of the aforementioned four compartments formed in the void by the baffles. An advantage of this arrangement is that waste from one dispensing region will tend to fall into the compartment immediately below it and not into a neighbouring compartment, and thus—in an implementation where fluid and food hoppers are provided—food waste is unlikely to mix with fluid waste. Were it not for this arrangement, fluid waste could combine with food waste to form a mush in the receptacle that can tend to make it harder to clean.

It will be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst it is preferred for the storage compartments of the two hoppers to be transparent (or at least translucent) so that the owner can easily see when they need refilling, they could instead be opaque. It is also the case that whilst the feeder described above has been conceived for indoor use, it could be used outside if measures are taken to ensure that rain cannot fall into the receptacle (for example, by modifying the feeder so that it includes a domed cover that fits on top of the two hoppers and extends over the receptacle, or by locating the feeder in a sheltered part of the cage). Furthermore, whilst in the preferred embodiment each hopper provides two dispensing regions, it will be appreciated that a greater or fewer number of dispensing regions could instead be provided. For example, the trays and hopper support could be redesigned to provide three dispensing regions per hopper. It is also envisaged for the two hoppers to be combined into one larger hopper that comprises a single storage compartment which interfaces with an X-shaped dispensing tray. In addition, whilst in the preferred embodiment the receptacle is configured so that it can be mounted on a pole, it will be apparent to persons of ordinary skill in the art that the receptacle could instead (or additionally) be configured so that the feeder can be suspended within a cage.

Lastly, whilst it is preferred for the hopper compartments and trays to be push-fitted to one another (and retained in that position by frictional engagement between walls of the two components), it will be apparent to persons of skill in the art that whilst such an arrangement is preferred the hopper compartment could simply sit upon the tray (i.e. not engage with the tray). The hopper compartment could also be coupled to the tray by means other than frictional engagement, for example by one or more fasteners.

It should also be noted that whilst the accompanying claims set out particular combinations of features described herein, the scope of the present invention is not limited to the particular combinations hereafter claimed, but instead extends to encompass any combination of features herein disclosed.

The invention claimed is:

1. A bird feeder comprising:
   a food hopper for providing a supply of food for a bird, said food hopper comprising a food storage compartment for the supply of food for the bird, and a food tray into which the food from said food storage compartment can flow;
   a fluid hopper for providing a supply of fluid for the bird, said fluid hopper comprising a fluid storage compartment for the supply of fluid for the bird, and a fluid tray into which the fluid from said fluid storage compartment can flow;
   a receptacle for waste food and fluid, and
   a hopper support configured to support the food hopper in such a position that the food from the food storage compartment can flow to the food tray, and configured to support the fluid hopper in such a position that the fluid from the fluid storage compartment can flow to the fluid tray, and configured so that the waste food and fluid can pass into said receptacle;
   wherein the fluid tray for the fluid hopper includes an internal wall that subdivides an internal void defined by a plurality of peripheral walls of said fluid tray so that the supply of fluid from said fluid storage compartment does not overflow said fluid tray;
   wherein said hopper support includes a skirt for obstructing bird access to the waste within said receptacle, said skirt configured to cover a central portion of said receptacle and leave a peripheral gap through which waste can pass, the peripheral gap being formed between an outer edge of said skirt and an inner edge of said receptacle;
   wherein the food hopper is removable from the feeder for cleaning or for replenishing the supply of food in said food storage compartment, and the fluid hopper is removable from the feeder for cleaning or for replenishing the supply of fluid in said fluid storage compartment.

2. A bird feeder according to claim 1, wherein said food and fluid trays define a plurality of spaced dispensing regions into which the food and fluid from said food and fluid storage compartments can flow.

3. A bird feeder according to claim 2, wherein said receptacle defines a void for receipt of the waste food and fluid, the void defined by said receptacle being subdivided into a plurality of smaller voids by a plurality of baffles that each comprise a radial wall, said baffles being configured to disrupt air flow between said skirt and said receptacle.

4. A bird feeder according to claim 3, wherein said receptacle co-operates with said hopper support so that each dispensing region is associated with a different one of the smaller voids, the arrangement being such that waste from one said dispensing region tends to pass only into the smaller void associated with that dispensing region and not into adjacent smaller voids.

5. A bird feeder according to claim 1, wherein said skirt is domed so as to deter birds from roosting on the skirt and to cause the waste to fall down to the outer edge of said skirt and into said receptacle through the peripheral gap.

6. A bird feeder according to claim 1, wherein said food and fluid hoppers each include a flat rear wall, and said hopper support is configured to support said food and fluid hoppers in a back-to-back arrangement.

7. A bird feeder according to claim 6, wherein said back to back hoppers cooperate to provide a domed surface that is uppermost in use, said domed surface acting to deter birds from roosting on the back-to-back hoppers.

8. A bird feeder according to claim 1, wherein said food and fluid hoppers include a curved surface that is uppermost in use, said curved surface acting to deter birds from roosting on top of the food and fluid hoppers.

9. A bird feeder according to claim 1, further comprising a perch.

10. A bird feeder according to claim 9, wherein said perch is located above said receptacle so that waste food or fluid will tend to pass into the receptacle.

11. A bird feeder according to claim 9, wherein the perch is configured to couple to said hopper support.

12. A bird feeder according to claim 1, wherein said food storage compartment and food tray are separably push fitted to one another; and said fluid storage compartment and fluid tray are separably push fitted to one another.

13. A bird feeder according to claim 1, wherein said receptacle is configured to define a void into which a bird feeder mounting pole can be inserted.

14. A bird feeder comprising:
    a hopper for providing a supply of fluid for a bird, said hopper comprising a storage compartment for the supply of fluid for the bird, and a tray into which the fluid from said storage compartment can flow;
    a receptacle for waste fluid, and
    a hopper support configured to support the hopper in such a position that the fluid can flow from said storage compartment to the tray, and so that the waste fluid can pass into said receptacle;
    wherein the tray for the hopper includes an internal wall that subdivides an internal void defined by a plurality of peripheral walls of said tray so that the supply of fluid from said storage compartment does not overflow said tray.

15. A bird feeder according to claim 14, wherein said internal wall comprises first and second taller regions, and a third shorter region located between said first and second taller regions, and said third shorter region includes a notch through which fluid can flow from said storage compartment into said tray so that the supply of fluid from said storage compartment does not overflow said tray.

16. A bird feeder comprising:
    a domed receptacle for waste food or fluid, said receptacle defining an internal void that is subdivided into four smaller voids by a plurality of radial walls;
    a first hopper for the supply of fluid, said first hopper including a storage compartment for the supply of fluid for a bird, and a tray into which the fluid from said storage compartment can flow, said tray including first and second spaced dispensing regions;
    a second hopper for the supply of food; said second hopper including a storage compartment for the supply of food for the bird, and a tray into which the food from said storage compartment can flow, said tray including third and fourth spaced dispensing regions;
    a hopper support having a skirt that is configured to be supported on the radial walls that subdivide the internal void within the receptacle, the hopper support being inversely domed to the receptacle, said hopper support including four upstanding spaced columns; and
    a circular perch connectable to said columns so that said perch lies above said skirt and the receptacle below the skirt;
    wherein said tray of the first hopper includes an internal wall that subdivides an internal void defined by a plurality of peripheral walls of said tray of the first hopper so that the supply of fluid from said storage compartment of the first hopper does not overflow said tray of the first hopper;

wherein said skirt of said hopper support is configured to cover a central portion of said receptacle and form a peripheral gap through which waste can pass, the peripheral gap being formed between an outer edge of said skirt and an inner edge of said receptacle so that the waste food or fluid can pass through the gap into said receptacle;

wherein said first and second hoppers can be supported on said hopper support in abutment with said columns in a back-to-back configuration so that each dispensing region of said first, second, third and fourth dispensing regions lies between two of said four columns, said four dispensing regions being spaced from one another by approximately 90 degrees.

17. A bird feeder according to claim 16, wherein when said first and second hoppers are supported on said hopper support in abutment with said columns in the back-to-back configuration, each dispensing region of said first, second, third and fourth dispensing regions lies above one of the four smaller voids in said receptacle.

18. A bird feeder according to claim 16, wherein the internal wall of said tray of the first hopper comprises first and second taller regions, and a third shorter region located between said first and second taller regions, and said third shorter region includes a notch through which fluid can flow from said storage compartment of the first hopper into said tray of the first hopper so that the supply of fluid from the storage compartment of the first hopper does not overflow the tray of the first hopper.

* * * * *